United States Patent [19]

Warzelhan et al.

[11] Patent Number: 5,817,721
[45] Date of Patent: Oct. 6, 1998

[54] BIODEGRADABLE POLYMERS, THE PREPARATION THEREOF AND THE USE THEREOF FOR PRODUCING BIODEGRADABLE MOLDINGS

[75] Inventors: Volker Warzelhan, Weisenheim; Gunnar Schornick, Neuleiningen; Matthias Kroner, Eisenberg; Ursula Seeliger, Ludwigshafen; Motonori Yamamoto, Mannheim; Rainer Büschl, Böhl-Iggelheim, all of Germany

[73] Assignee: BASF Aktiengesellschaft, Ludwigshafen, Germany

[21] Appl. No.: 836,311

[22] PCT Filed: Nov. 4, 1995

[86] PCT No.: PCT/EP95/04335

§ 371 Date: May 12, 1997

§ 102(e) Date: May 12, 1997

[87] PCT Pub. No.: WO96/15175

PCT Pub. Date: May 23, 1996

[30] Foreign Application Priority Data

Nov. 15, 1994 [DE] Germany .......................... 44 40 850.1

[51] Int. Cl.$^6$ .............................. C08F 20/00; C08G 63/12
[52] U.S. Cl. .......................... 525/437; 528/272; 528/295; 528/296; 528/302; 528/307; 528/308; 528/308.6; 525/444; 525/445; 525/450; 525/451
[58] Field of Search ...................................... 528/272, 295, 528/296, 302, 307, 308, 308.6; 525/437, 444, 445, 450, 451

[56] References Cited

U.S. PATENT DOCUMENTS

| 5,097,005 | 3/1992 | Tietz ........................................ 528/272 |
| 5,247,049 | 9/1993 | Groll et al. ................................. 128/73 |
| 5,593,778 | 1/1997 | Kondo et al. ............................. 428/373 |
| 5,616,657 | 4/1997 | Imamura et al. ........................ 525/437 |

FOREIGN PATENT DOCUMENTS

| 534 295 | 3/1993 | European Pat. Off. . |
| 565 235 | 10/1993 | European Pat. Off. . |
| 569 143 | 11/1993 | European Pat. Off. . |
| 92/13019 | 8/1992 | WIPO . |

OTHER PUBLICATIONS

Derwent Abstracts WPI, Week 9231, AN 92–256555 (English abstract of JP–A 04175375. *Nature*, vol. 270, pp. 76–78, 1977.

Tokiwa et al., *J. of Appl. Pol. Sci.*, vol. 26, pp. 441–448, 1981.

Witt et al., Handout of a Poster, International Workshop of the Royal Inst. of Tech., Stockholm, Sweden, pp. 21–23, Apr. 1994.

*Primary Examiner*—Samuel A. Acquah
*Attorney, Agent, or Firm*—Keil & Weinkauf

[57] ABSTRACT

A biodegradable polyester obtainable by reacting a mixture comprising (a1) from 95 to 99.9% by weight of a polyester P1 obtainable by reacting a mixture essentially comprising
(b1) a mixture comprising
35–95 mol % of adipic acid or ester-forming derivatives thereof,
5–65 mol % of terephthalic acid or ester-forming derivatives thereof, and
0–5 mol % of a compound containing sulfonate groups, and
(b2) a dihydroxy compound selected from the group consisting of $C_2$–$C_6$-alkanediols and $C_5$–$C_{10}$-cycloalkanediols,
with the proviso that a compound D with at least three groups capable of ester formation is employed to prepare the polyester P1,
(a2) from 0.1 to 5% by weight of a divinyl ether C1 and
(a3) from 0 to 5 mol %, based on component (b1) from the preparation of P1, of compound D,
and other biodegradable polymers and thermoplastic molding compositions, processes for the preparation thereof, the use thereof for producing biodegradable moldings and adhesives.

15 Claims, No Drawings

BIODEGRADABLE POLYMERS, THE PREPARATION THEREOF AND THE USE THEREOF FOR PRODUCING BIODEGRADABLE MOLDINGS

The present invention relates to biodegradable polyesters Q1 with a molecular weight ($M_n$) in the range from 6000 to 60,000 g/mol, a viscosity number in the range from 30 to 350 g/ml (measured in o-dichlorobenzene/phenol (50/50 ratio by weight) at a concentration of 0.5% by weight of polyester Q1 at 25° C.) and a melting point in the range from 50° to 170° C., obtainable by reacting a mixture essentially comprising (a1) from 95 to 99.9% by weight of a polyester P1 obtainable by reacting a mixture essentially comprising (b1) a mixture essentially comprising
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three groups capable of ester formation are employed to prepare the polyester P1, (a2) from 0.1 to 5% by weight of a divinyl ether C1 and (a3) from 0 to 5 mol %, based on component (b1) from the preparation of P1, of compound D.

The invention furthermore relates to other polymers and biodegradable thermoplastic molding compositions as claimed in the dependent claims, processes for the preparation thereof, the use thereof for producing biodegradable moldings and adhesives, biodegradable moldings, foams and blends with starch obtainable from the polymers and molding compositions according to the invention.

Polymers which are biodegradable, ie. decompose under environmental influences in an appropriate and demonstrable time span have been known for some time. This degradation usually takes place by hydrolysis and/or oxidation, but predominantly by the action of microorganisms such as bacteria, yeasts, fungi and algae. Y. Tokiwa and T. Suzuki (Nature, 270, (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights displaying unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

According to EP-A 534,295, a chain extension can also be achieved advantageously by reaction with divinyl ethers.

WO 92/13019 discloses copolyesters based on predominantly aromatic dicarboxylic acids and aliphatic diols, where at least 85 mol % of the polyester diol residue comprises a terephthalic acid residue. The hydrophilicity of the copolyester is increased, and the crystallinity is reduced by modifications such as the incorporation of up to 2.5 mol % of metal salts of 5-sulfoisophthalic acid or short-chain ether diol segments such as diethylene glycol. This is said in WO 92/13019 to make the copolyesters biodegradable. However, the disadvantage of these copolyesters is that biodegradation by microorganisms have not been demonstrated, on the contrary only the behavior toward hydrolysis in boiling water or, in some cases, also with water at 60° C. has been carried out.

According to the statements of Y. Tokiwa and T. Suzuki (Nature, 270 (1977) 76–78 or J. of Appl. Polymer Science, 26 (1981) 441–448), it may be assumed that polyesters which are essentially composed of aromatic dicarboxylic acid units and aliphatic diols, such as PET (polyethylene terephthalate) and PBT (polybutylene terephthalate), are not enzymatically degradable. This also applies to copolyesters which contain blocks composed of aromatic dicarboxylic acid units and aliphatic diols.

Witt et al. (handout for a poster at the International Workshop of the Royal Institute of Technology, Stockholm, Sweden, Apr. 21–23, 1994) described biodegradable copolyesters based on 1,3-propanediol, terephthalic ester and adipic or sebacic acid. A disadvantage of these copolyesters is that moldings produced therefrom, especially sheets, have inadequate mechanical properties.

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by microorganisms is not to be achieved at the expense of the mechanical properties in order not to restrict the number of applications.

We have found that this object is achieved by the polymers and thermoplastic molding compositions defined at the outset.

We have also found processes for the preparation thereof, the use thereof for producing biodegradable moldings and adhesives, and biodegradable moldings, foams, blends with starch and adhesives obtainable from the polymers and molding compositions according to the invention.

The biodegradable polyesters Q1 according to the invention have a molecular weight ($M_n$) in the range from 6000 to 60,000, preferably from 8000 to 50,000, particularly preferably from 10,000 to 40,000, g/mol, a viscosity number in the range from 30 to 350, preferably from 50 to 300 g/ml (measured in o-dichlorobenzene/phenol (50/50 ratio by weight) at a concentration of 0.5% by weight of polyester Q1 at 25° C.) and a melting point in the range from 50° to 170° C., preferably from 60° to 160° C.

The polyesters Q1 are obtained according to the invention by reacting a mixture essentially comprising (a1) from 95 to 99.9, preferably from 96 to 99.8, particularly preferably from 97 to 99.65% by weight of a polyester P1,
(a2) from 0.1 to 5, preferably 0.2 to 4, particularly preferably from 0.35 to 3% by weight of a divinyl ether C1 and
(a3) from 0 to 5, preferably from 0 to 4, mol %, based on component (b1) from the preparation of P1, of a compound D.

Preferred polyesters P1 have a molecular weight ($M_n$) in the range from 5000 to 50,000, preferably from 6000 to 45,000, particularly preferably from 8000 to 35,000, g/mol, a viscosity number in the range from 30 to 350, preferably from 50 to 300 g/ml (measured in o-dichlorobenzene/phenol (50/50 ratio by weight) at a concentration of 0.5% by weight of polyester P1 at 25° C.) and a melting point in the range from 50 to 170, preferably from 60° to 160° C.

The polyesters P1 are usually obtained by reacting a mixture essentially comprising (b1) a mixture essentially comprising
35–95, preferably from 45 to 80 mol % of adipic acid or ester-forming derivatives thereof, in particular the di-$C_1$–$C_6$-alkyl esters such as dimethyl, diethyl, dipropyl, dibutyl, dipentyl and dihexyl adipate, or mixtures thereof, preferably adipic acid and dimethyl adipate, or mixtures thereof, 5–65, preferably 20–55 mol % of terephthalic acid or ester-forming derivatives thereof, in particular the di-$C_1$–$C_6$-alkyl esters such as dimethyl, diethyl, dipropyl, dibutyl, dipentyl or dihexyl terephthalate, or mixtures thereof, preferably terephthalic acid and dimethyl terephthalate, or mixtures thereof, and 0–5, preferably from 0 to 3, particularly preferably from 0.1 to 2, mol % of a compound which contains sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, preferably from 0.6:1 to 1.1:1.

The compound containing sulfonate groups which is normally employed is an alkali metal or alkaline earth metal salt of a dicarboxylic acid containing sulfonate groups, or the ester-forming derivatives thereof, preferably alkali metal salts of 5-sulfoisophthalic acid or mixtures thereof, particularly preferably the sodium salt.

The dihydroxy compounds (b2) employed according to the invention are selected from the group consisting of $C_2$–$C_6$-alkanediols and $C_5$–$C_{10}$-cycloalkanediols, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, 1,4-cyclohexanediol, 1,2-cyclohexanedimethanol, 1,4-cyclohexanedimethanol, and mixtures thereof.

It is furthermore possible to employ from 0 to 5, preferably from 0.05 to 4, mol %, based on the component (b1), of at least one compound D with at least three groups capable of ester formation for preparing the polyesters P1.

The compounds D preferably contain three to ten functional groups capable of forming ester linkages. Particularly preferred compounds D have 3 to 6 functional groups of this type in the molecule, in particular 3 to 6 hydroxyl groups and/or carboxyl groups. Examples which may be mentioned are:

tartaric acid, citric acid, malic acid;
trimethylolpropane, trimethylolethane;
pentaerythritol;
polyethertriols; glycerol;
trimesic acid;
trimellitic acid or anhydride;
pyromellitic acid or dianhydride and
hydroxyisophthalic acid.

When compounds D which have a boiling point below 200° C. are used in the preparation of the polyesters P1, a proportion may distil out of the polycondensation mixture before the reaction. It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process.

By adding the compound D it is possible, for example, to alter the melt viscosity in a desired manner, to increase the impact strength and to reduce the crystallinity of the polymers or molding compositions according to the invention.

The preparation of the biodegradable polyesters P1 is known in principle (Sorensen and Campbell, Preparative Methods of Polymer Chemistry, Interscience Publishers, Inc., New York, 1961, pages 111–127; Encyl. of Polym. Science and Eng., Vol. 12, 2nd Edition, John Wiley & Sons, 1988, pages 1–75; Kunststoff-Handbuch, Volume 3/1, Carl Hanser Verlag, Munich, 1992, pages 15–23 (Preparation of Polyesters); WO 92/13019; EP-A 568 593; EP-A 565 235; EP-A 28 687) so that details on this are superfluous.

Thus, for example, the reaction of dimethyl esters of component (b1) with component (b2) (transesterification) can be carried out at from 160° to 230° C. in the melt under atmospheric pressure, advantageously under an inert gas atmosphere.

In the preparation of the biodegradable polyester P1 it is advantageous to use a molar excess of component (b2) relative to component (b1), for example up to 2½ times, preferably up to 1.67 times.

The biodegradable polyester P1 is normally prepared with addition of suitable conventional catalysts such as metal compounds based on the following elements such as Ti, Ge, Zn, Fe, Mn, Co, Zr, V, Ir, La, Ce, Li, and Ca, preferably organometallic compounds based on these metals, such as salts of organic acids, alkoxides, acetylacetonates and the like, particularly preferably based on zinc, tin and titanium.

When dicarboxylic acids or anhyrides thereof are used as component (b1), esterification thereof with component (b2) can take place before, at the same time as or after the transesterification. In a preferred embodiment, the process described in DE-A 23 26 026 for preparing modified polyalkylene terephthalates can be used.

After the reaction of components (b1) and (b2), the polycondensation is carried out as far as the desired molecular weight, as a rule under reduced pressure or in a stream of inert gas, for example of nitrogen, with further heating to from 180° to 260° C.

In order to prevent unwanted degradation and/or side reactions, it is also possible in this stage of the process if required to add stabilizers. Examples of such stabilizers are the phosphorus compounds described in EP-A 13 461, U.S. Pat. No. 4,328,049 or in B. Fortunato et al., Polymer Vol. 35, No. 18, pages 4006–4010, 1994, Butterworth-Heinemann Ltd. These may also in some-cases act as inactivators of the catalysts described above. Examples which may be mentioned are: organophosphites, phosphonous acid and phosphorous acid. Examples of compounds which act only as stabilizers are: trialkyl phosphites, triphenyl phosphite, trialkyl phosphates, triphenyl phosphate and tocopherol (Vitamin E; obtainable as Uvinul® 2003AO (BASF) for example).

On use of the biodegradable copolymers, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zinc compounds are non-toxic as a rule (Sax Toxic Substance Data Book, Shizuo Fujiyama, Maruzen, K. K., 360 S. (cited in EP-A 565,235), see also Römpp Chemie Lexikon Vol. 6, Thieme Verlag, Stuttgart, New York, 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to biodegradable polyester P1 is normally in the range from 0.01:100 to 3:100, preferably from 0.05:100 to 2:100, it also being possible to employ smaller quantities, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyesters P1. It is also possible if required to employ different catalysts or mixtures thereof.

Observations to date indicate that all conventional and commercially obtainable divinyl ethers can be employed as divinyl ethers C1. The divinyl ethers which are preferably employed are selected from the group consisting of 1,4-butanediol divinyl ether, 1,6-hexanediol divinyl ether and 1,4-cyclohexanedimethanol divinyl ether.

The reaction of the polyester P1 with the divinyl ether C1 is normally catalyzed by cations and preferably takes place in the melt, it being necessary to ensure where possible that no side reactions leading to crosslinking or gel formation take place. In a particular embodiment, the reaction is normally carried out at from 90 to 230, preferably from 100° to 200° C., with the addition of the divinyl ether advantageously taking place in several portions or continuously.

If required, the reaction of the polyester P1 with the divinyl ether C1 can also be carried out in the presence of conventional inert solvents such as toluene, methyl ethyl ketone, tetrahydrofuran (THF) or ethyl acetate or mixtures thereof, the temperature chosen for the reaction being, as a rule, in the range from 80 to 200, preferably from 90° to 150° C.

The reaction with the divinyl ether C1 can be carried out batchwise or continuously, for example in stirred vessels, reaction extruders or through mixing heads.

It is also possible to employ in the reaction of the polyesters P1 with the divinyl ethers C1 conventional catalysts known in the art (for example first described in EP-A 534,295). Examples which may be mentioned are: organic carboxylic acids such as oxalic acid, tartaric acid and citric acid, it again being necessary to ensure that the compounds which are employed are non-toxic where possible.

Although the theoretical optimum for the reaction of P1 with divinyl ether C1 is a 1:1 molar ratio of vinyl ether functionality to P1 end group (polyesters P1 with mainly hydroxyl end groups are preferred), the reaction can also be carried out without technical problems at molar ratios of from 1:3 to 1.5:1. With molar ratios of >1:1 it is possible if desired to add, during the reaction or else after the reaction, a chain extender selected from the components (b2), preferably a $C_2$–$C_6$-diol.

The biodegradable polymers T1 according to the invention have a molecular weight ($M_n$) in the range from 10,000 to 100,000, preferably from 11,000 to 80,000, preferably from 11,000 to 50,000 g/mol, a viscosity number in the range from 30 to 450, preferably from 50 to 400 g/ml (measured in o-dichlorobenzene/phenol (50/50 ratio by weight) at a concentration of 0.5% by weight of polymer T1 at 25° C.) and a melting point in the range from 50 to 235, preferably from 60° to 235° C.

The biodegradable polymers T1 are obtained according to the invention by reacting a polyester Q2 with (d1) 0.1–5, preferably from 0.2 to 4, particularly preferably from 0.3 to 2.5% by weight, based on the polyester Q2, of divinyl ether C1 and with (d2) 0–5, preferably from 0 to 4, mol %, based on component (b1) from the preparation of polyester Q2 via the polyester P1, of compound D.

This normally results in a chain extension, with the resulting polymer chains preferably having a block structure.

Preferred biodegradable polyesters Q2 have a molecular weight ($M_n$) in the range from 5000 to 100,000, preferably from 8000 to 80,000, by a viscosity number in the range from 30 to 450, preferably from 50 to 400 g/ml (measured in o-dichlorobenzene/phenol (50/50 ratio by weight) at a concentration of 0.5% by weight of polyester Q2 at 25° C.) and a melting point in the range from 50 to 235, preferably from 60° to 235° C.

The polyesters Q2 are generally obtained by reacting a mixture essentially comprising (c1) polyester P1, (c2) 0.01–50, preferably from 0.1 to 40, % by weight, based on (c1), of hydroxy carboxylic acid B1, where the hydroxy carboxylic acid B1 is defined by the formulae Ia or Ib

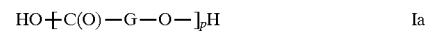

Ia

Ib where p is an integer from 1 to 1500, preferably from 1 to 1000, and r is 1, 2, 3 or 4, preferably 1 and 2, and G is a radical which is selected from the group consisting of phenylene, —$(CH_2)_n$—, where n is an integer from 1, 2, 3, 4 or 5, preferably 1 and 5, —C(R)H— and —C(R)HCH$_2$, where R is methyl or ethyl, and (c3) 0–5, preferably from 0 to 4 mol %, based on component (b1) from the preparation of P1, of compound D.

In a preferred embodiment, the hydroxy carboxylic acid B1 employed is: glycolic acid, D-, L- or D,L-lactic acid, 6-hydroxyhexanoic acid, the cyclic derivatives thereof such as glycolide (1,4-dioxane-2,5-dione), D- or L-dilactide (3,6-dimethyl-1,4-dioxane-2,5-dione), p-hydroxybenzoic acid and oligomers and polymers such as poly-3-hydroxybutyric acid, polyhydroxyvaleric acid, polylactide (obtainable as EcoPLA® from Cargill, for example) and a mixture of poly-3-hydroxybutyric acid and polyhydroxyvaleric acid (the latter is obtainable under the name Biopol® from Zeneca).

The reaction of the polyesters P1 with the hydroxy carboxylic acid B1, if required in the presence of compound D, preferably takes place in the melt at from 120° to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyesters P1).

A preferred embodiment relates to polyesters Q2 with block structures formed from components P1 and B1: when cyclic derivatives of B1 (compounds Ib) are used it is possible in the reaction with the biodegradable polyester P1 to obtain, by a ring-opening polymerization initiated by the end groups of P1, in a conventional way polyesters Q2 with block structures (on the ring-opening polymerization, see Encycl. of Polym. Science and Eng. Volume 12, 2nd Edition, John Wiley & Sons, 1988, pages 36–41). The reaction can, if required, be carried out with addition of conventional catalysts like the transesterification catalysts described hereinbefore, and tin octanoate is particularly preferred (see also Encycl. of Polym. Science and Eng. Vol. 12, 2nd Edition, John Wiley & Sons, 1988, pages 36–41).

When components B1 with higher molecular weights, for example with a p above 10 (ten) are used, it is possible to obtain, by reaction with the polyesters P1 in stirred vessels or extruders, the desired block structures by the choice of the reaction conditions such as temperature, holdup time, addition of transesterification catalysts like the abovementioned. Thus, J. of Appl. Polym. Sci., 32 (1986) 6191–6207 and Makromol. Chemie, 136 (1970) 311–313 disclose that in the reaction of polyesters in the melt it is possible to obtain from a blend by transesterification reactions initially block copolymers and then random copolymers.

The polymers T1 are, as a rule, prepared in a similar way to the polyesters Q1.

The biodegradable polymers T2 according to the invention have a molecular weight ($M_n$) in the range from 10,000 to 100,000, preferably from 11,000 to 80,000, particularly preferably from 11,000 to 50,000, g/mol, a viscosity number in the range from 30 to 450, preferably from 50 to 400 g/ml (measured in o-dichlorobenzene/phenol (50/50 ratio by weight) at a concentration of 0.5% by weight of polymer T2 at 25° C.) and a melting point in the range from 50 to 235, preferably from 60° to 235° C.

The biodegradable polymers T2 are obtained according to the invention by reacting the polyester Q1 with (e1) 0.01–50, preferably from 0.1 to 40% by weight, based on the polyester Q1, of the hydroxy carboxylic acid B1 and with (e2) 0–5, preferably from 0 to 4 mol %, based on component (b1) from the preparation of polyester Q1 via the polyester P1, of compound D, the procedure expediently being similar to the reaction of polyester P1 with hydroxy carboxylic acid B1 to give the polyester Q2.

The biodegradable polymers T3 according to the invention have a molecular weight ($M_n$) in the range from 10,000 to 100,000, preferably from 11,000 to 80,000 g/mol, a viscosity number in the range from 30 to 450, preferably from 50 to 400 g/ml (measured in o-dichlorobenzene/phenol (50/50 ratio by weight) at a concentration of 0.5% by weight of polymer T3 at 25° C.) and a melting point in the range from 50 to 235, preferably from 60° to 235° C.

The biodegradable polymers T3 are obtained according to the invention by reacting (f1) polyester P2, or (f2) a mixture essentially comprising polyester P1 and 0.01–50, preferably from 0.1 to 40% by weight, based on the polyester P1, of hydroxy carboxylic acid B1, or (f3) a mixture essentially comprising polyesters P1 which differ from one another in composition, with 0.1–5, preferably from 0.2–4, particularly preferably from 0.3 to 2.5% by weight, based on the quantity of polyesters employed, of divinyl ether C1 and with 0–5, preferably from 0 to 4 mol %, based on the particular molar quantities of component (b1) employed to prepare the polyesters (f1) to (f3) employed, of compound D, the reactions expediently being carried out in a similar way to the preparation of the polyesters Q1 from the polyesters P1 and the divinyl ethers C1.

Preferred biodegradable polyesters P2 have a molecular weight ($M_n$) in the range from 5000 to 80,000, preferably from 6000 to 45,000, particularly preferably from 10,000 to 40,000, g/mol, a viscosity number in the range from 30 to 450, preferably from 50 to 400 g/ml (measured in o-dichlorobenzene/phenol (50/50 ratio by weight) at a concentration of 0.5% by weight of polyester P2 at 25° C.) and a melting point in the range from 50 to 235, preferably from 60° to 235° C.

The biodegradable polyesters P2 are generally obtained by reacting a mixture essentially comprising (g1) a mixture essentially comprising 20–95, preferably from 25 to 80, particularly preferably from 30 to 70, mol % of adipic acid or ester-forming derivatives thereof or mixtures thereof, 5–80, preferably from 20 to 75, particularly preferably from 30 to 70, mol % of terephthalic acid or ester-forming derivatives thereof or mixtures thereof, and 0–5, preferably from 0 to 3, particularly preferably from 0.1 to 2, mol % of a compound which contains sulfonate groups, where the total of the individual mole percentages is 100 mol %, (g2) dihydroxy compound (b2), where the molar ratio of (g1) to (g2) is chosen in the range from 0.4:1 to 1.5:1, preferably from 0.6:1 to 1.1:1, (g3) from 0.01 to 100, preferably from 0.1 to 80, % by weight, based on component (g1), of a hydroxy carboxylic acid B1, and (g4) from 0 to 5, preferably from 0 to 4, particularly preferably from 0.01 to 3.5, mol %, based on component (g1), of compound D.

The low molecular weight and cyclic derivatives of the hydroxy carboxylic acid B1 are particularly preferred for preparing the polyester P2.

The biodegradable polyesters P2 are expediently prepared in a similar way to the preparation of the polyesters P1, it being possible to add the hydroxy carboxylic acid B1 both at the start of the reaction and after the esterification or transesterification stage.

In a preferred embodiment, polyesters P2 whose repeating units are randomly distributed in the molecule are employed.

However, it is also possible to employ polyesters P2 whose polymer chains have block structures. Polyesters P2 of this type can generally be obtained by appropriate choice, in particular of the molecular weight, of the hydroxy carboxylic acid B1. Thus, according to observations to date there is generally only incomplete transesterification when a high molecular weight hydroxy carboxylic acid B1 is used, in particular with a p above 10, for example even in the presence of the inactivators described above (see J. of Appl. Polym. Sci. 32 (1986) 6191–6207 and Makromol. Chemie, 136 (1970) 311–313). If required, the reaction can also be carried out in solution using the solvents mentioned for the preparation of the polymers T1 from the polyesters Q2 and the divinyl ethers C1.

The biodegradable thermoplastic molding compositions T4 are obtained according to the invention by mixing in a conventional way, preferably with the addition of conventional additives such as stabilizers, processing aids, fillers etc (see J. of Appl. Polym. Sci., 32 (1986) 6191–6207; WO 92/0441; EP 515,203; Kunststoff-Handbuch, Vol. 3/1, Carl Hanser Verlag Munich, 1992, pages 24–28)

(h1) 99.5–0.5% by weight of polyester Q1 with (h2) 0.5–99.5% by weight of hydroxy carboxylic acid B1.

In a preferred embodiment, high molecular weight hydroxy carboxylic acids B1 such as polycaprolactone or polylactide (eg. Eco-PLA®) or polyglycolide or polyhydroxyalkanoates such as poly-3-hydroxybutyric acid, polyhydroxyvaleric acid and a mixture of poly-3-hydroxybutyric acid and polyhydroxyvaleric acid (eg. Biopol®) with a molecular weight ($M_n$) in the range from 10,000 to 150,000, preferably from 10,000 to 100,000, g/mol are employed.

WO 92/0441 and EP-A 515 203 disclose that high molecular weight polylactide without added plasticizers is too brittle for most applications. It is possible in a preferred embodiment to prepare a blend starting from 0.5–20, preferably from 0.5 to 10, % by weight of polyester and 99.5–80, preferably from 99.5 to 90, % by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60, % by weight of polyester Q1 and from 0.5 to 60, preferably from 0.5 to 40, % by weight of a high molecular weight hydroxy carboxylic acid B1, particularly preferably polylactide, polyglycolide, polycaprolactone and polyhydroxybutyric acid. Blends of this type can be completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another preferred embodiment it is possible to replace 0–50, preferably 0–30, mol % of the adipic acid or the ester-forming derivatives thereof or the mixtures thereof by at least one other aliphatic $C_4$–$C_{10}$- or cycloaliphatic $C_5$–$C_{10}$-dicarboxylic acid or dimer fatty acids such as succinic acid, glutaric acid, pimelic acid, suberic acid, azelaic acid or sebacic acid or an ester derivate such as the di-$C_1$–$C_6$-alkyl esters thereof or the anhydrides thereof such as succinic anhydride, or mixtures thereof, preferably succinic acid, succinic anhydride, sebacic acid, dimer fatty acid and di-$C_1$–$C_6$-alkyl esters such as dimethyl, diethyl, di-n-propyl, diisobutyl, di-n-pentyl, dineopentyl, di-n-hexyl esters thereof, especially dimethyl succinate.

A particularly preferred embodiment relates to the use as component (b1) of the mixture, described in EP-A 7445, of succinic acid, adipic acid and glutaric acid and the $C_1$–$C_6$-alkyl esters thereof, especially the dimethyl ester and diisobutyl ester.

In another preferred embodiment it is possible to replace 0–50, preferably 0–40, mol % of the terephthalic acid or the ester-forming derivatives thereof, or the mixtures thereof, by at least one other aromatic dicarboxylic acid such as isophthalic acid, phthalic acid or 2,6-naphthalenedicarboxylic acid, preferably isophthalic acid, or an ester derivative such as a di-$C_1$–$C_6$-alkyl ester, in particular the dimethyl ester, or mixtures thereof.

It should be noted in general that the various polymers according to the invention can be worked up in a conventional way by isolating the polymers or, in particular if it is wished to react the polyesters P1, P2, Q2 and Q1 further, by not isolating the polymers but immediately processing them further.

The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by conventional methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in a melt of the polymers according to the invention.

It is possible to add from 0 to 80% by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zinc stearate, and montan waxes. Such stabilizers etc. are described in detail in Kunststoff-Handbuch, Vol. 3/1, Carl Hanser Verlag, Munich, 1992, pages 24–28.

The polymers according to the invention can additionally be colored in any desired way by adding organic or inorganic dyes. The dyes can also in the wider sense be regarded as filler.

A particular application of the polymers according to the invention relates to the use as compostable sheet or a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sci. and Eng. Vol. 1, "Adhesive Compositions", pages 547–577). The polymers and molding compositions according to the invention can also be processed as disclosed in EP-A 21042 using suitable tackifying thermoplastic resins, preferably natural resins, by the methods described therein. The polymers and molding compositions according to the invention can also be further processed as disclosed in DE-A 4 234 305 to solvent-free adhesive systems such as hot melt sheets.

Another preferred application relates to the production of completely degradable blends with starch mixtures (preferably with thermoplastic starch as described in WO 90/05161) in a similar process to that described in DE-A 42 37 535. The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging materials for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372 846; Handbook of Polymeric foams and Foam Technology, Hanser Publisher, Munich, 1991, pages 375–408). This normally entails the polymer or molding composition according to the invention being initially melted, if required with the addition of up to 5% by weight of compound D, preferably pyromellitic dianhydride and trimellitic anhydride, then a blowing agent being added and the resulting mixture being exposed to a reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of components (b1) in various polymers makes the biological attack possible and thus achieves the desired biodegradability.

A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Enzyme assay

The polymers were cooled in a mill with liquid nitrogen or dry ice and ground finely (the rate of enzymatic degradation increases with the surface area of the ground material). For the enzyme assay, 30 mg of finely ground polymer powder and 2 ml of a 20 mM aqueous $K_2HPO_4$/$KH_2PO_4$ buffer solution (pH: 7.0) were placed in an Eppendorf tube (2 ml) and equilibrated at 37° C. on a rotator for 3 h. Subsequently, 100 units of lipase from either *Rhizopus arrhizus, Rhizopus delemar* or *Pseudomonas pl.* were added, and incubation was carried out at 37° C. on the rotator at 250 rpm for 16 h. The reaction mixture was then filtered through a Millipore® membrane (0.45 $\mu$m), and the DOC (dissolved organic carbon) of the filtrate was measured. In each case, a DOC measurement was carried out in a similar way only with buffer and enzyme (as enzyme control) and only with buffer and sample (as blank).

The ADOC values found (DOC(sample+enzyme)−DOC (enzyme control)−DOC(blank)) can be regarded as a measure of the enzymatic degradability of the samples. They are shown in each case comparing with a measurement using Polycaprolactone® Tone P 787 powder (Union Carbide). In the assessment, it should be noted that the data are not absolutely quantifiable. The relation between the surface area of the ground material and the rate of enzymatic degradation has been referred to above. In addition, the enzyme activities may also vary.

The molecular weights were measured by gel permeation chromatography (GPC):

Stationary phase: 5 MIXED B polystyrene gel columns (7.5×300 mm, PL gel 10 l) from Polymer Laboratories; Equilibration: 35° C.

Mobile phase: Tetrahydrofuran (flow rate: 1.2 ml/min)

Calibration: Molecular weight 500–10,000,000 g/mol with PS calibration kit from Polymer Laboratories.

In the oligomer range ethylbenzene/1,3-diphenylbutane/1,3,5-triphenylhexane/1,3,5,7-tetraphenyloctane/1,3,5,7,9-pentaphenyldecane Detection: RI (refractive index) Waters 410, UV (at 254 nm) Spectra Physics 100.

The hydroxyl number (OH number) and acid number (AN) were determined by the following methods:

(a) Determination of the apparent hydroxyl number 10 ml of toluene and 9.8 ml of acetylating reagent (see below) were added to about 1 to 2 g of accurately weighed test substance and heated with stirring at 95° C. for 1 h. Then 5 ml of distilled water were added. After cooling to room temperature, 50 ml of tetrahydrofuran (THF) were added, and potentiographic titration was carried out with ethanolic KOH standard solution to the turning point.

The experiment was repeated without test substance (blank sample).

The apparent OH number was then found from the following formula:

$$\text{apparent OH number } c \times t \times 56.1 \times (V2 - V1)/m \text{ (in mg KOH/g)}$$

where
   c=amount of substance concentration of the ethanolic KOH standard solution in mol/l,
   t=titer of the ethanolic KOH standard solution
   m=weight of test substance in mg
   V1=ml of standard solution used with test substance
   V2=ml of standard solution used without test substance.

Reagents used: Ethanolic KOH standard solution, c=0.5 mol/l, titer 0.9933 (Merck, Cat. No. 1.09114), acetic anhydride, analytical grade (Merck, Cat. No. 42), pyridine, analytical grade (Riedel de Haen, Cat. No. 33638), acetic acid, analytical grade (Merck, Cat. No. 1.00063), acetylating reagent: 810 ml of pyridine, 100 ml of acetic anhydride and 9 ml of acetic acid, water, deionized, THF and toluene b) Determination of the acid number (AN)

About 1 to 1.5 g of test substance were accurately weighed, mixed with 10 ml of toluene and 10 ml of pyridine and subsequently heated at 95° C. until dissolved. The solution was then cooled to room temperature, 5 ml of water and 50 ml of THF were added, and titration was carried out with 0.1N ethanolic KOH standard solution.

The determination was repeated without test substance (blank sample).

The acid number was then found from the following formula:

$$AN = c \times t \times 56.1 \times (V1-V2)/m \text{ (in mg KOH/g)}$$

where
   c=amount of substance concentration of the ethanolic KOH standard solution in mol/l,
   t=titer of the ethanolic KOH standard solution
   m=weight of test substance in mg
   V1=ml of standard solution used with test substance
   V2=ml of standard solution used without test substance.

Reagents used: Ethanolic KOH standard solution, c=0.1 mol/l, titer=0.9913 (Merck, Cat. No. 9115), Pyridine, analytical grade (Riedel de Haen, Cat. No. 33638), Water, deionized, THF and toluene.

(c) Determination of the OH number

The OH number is found from the sum of the apparent OH number and the AN:

$$\text{OH number} = \text{apparent OH number} + AN$$

| Abbreviations used: | |
|---|---|
| DOC: | dissolved organic carbon |
| DMT: | dimethyl terephthalate |
| PCL: | Polycaprolacton ® Tone p 787 (Union Carbide) |
| PMDA:. | pyromellitic dianhydride |
| AN: | acid number |
| TBOT: | tetrabutyl orthotitanate |
| VN: | Viscosity number (measured in o-dichlorobenzene/phenol (50/50 ratio by weight) at a concentration of 0.5% by weight of polymer at 25° C.) |
| $T_m$: | "melting point" = temperature at which a maximum endothermic heat flux occurs (extreme of the DSC traces) |
| $T_g$: | glass transition temperature (midpoint of the DSC traces) |

The DSC measurements were carried out with a 912+ Thermal Analyzer 990 DSC apparatus from DuPont. Conventional temperature and enthalpy calibration was used. The sample weight was typically 13 mg. The heating and cooling rates were 20 K/min unless otherwise indicated. The samples were measured under the following conditions: 1. Heating run on samples in the state as supplied, 2. rapid cooling from the melt, 3. heating run on the samples cooled from the melt (samples from 2). The second DSC runs in each case allowed comparison between the various samples after a uniform previous thermal history.

Example 1

Preparation of a polyester P1

(a) 4672 kg of 1,4-butanediol, 7000 kg of adipic acid and 50 g of tin dioctoate were reacted under a nitrogen atmosphere at 230°–240° C. After most of the water formed in the reaction had been removed by distillation, 10 g of TBOT were added to the reaction mixture. Once the acid number had fallen below 1, excess 1,4-butanediol was removed by distillation under reduced pressure until the OH number reached 56.

(b) 362 g of the polyester from Example 1(a), 234 g of DMT, 340 g of 1,4-butanediol and 1 g of TBOT were placed in a three-neck flask and heated, while stirring slowly, under a nitrogen atmosphere to 180° C. During this, the methanol formed in the transesterification was removed by distillation. The mixture was heated to 230° C. while increasing the stirring rate over the course of 2 h and, after a further hour, 0.4 g of 50% by weight aqueous phosphorous acid were added. The pressure was reduced to 5 mbar over the course of 1 h and was then kept at <2 mbar at 240 ° C. for 1 h, during which the excess 1,4-butanediol distilled out.

OH number: 13 mg KOH/g
AN: <1 mg KOH/g
VN: 58 g/ml
GPC (UV detection 200–300,000 MW range) $M_n$: 11,600/$M_w$: 29,892 (g/mol)
$T_m$: 88° C. (DSC, state as supplied), Tg: −42° C.

Example 2

Preparation of a polyester Q1

300 g of the product from Ex. 1(b) were cooled to 170° C., and 4.3 g of 1,4-butanediol divinyl ether were added in 4 portions over the course of 1 h. This chain extension increased the molecular weight (see GPC values), which led to a marked rise in the melt viscosity.

GPC (UV 300–800,000 MW range) $M_n$: 15,793/$M_w$: 60,459 (g/mol)

Example 3

Preparation of a polyester Q1

360.4 g of the polyester from Ex. 1(a), 227.2 g of DMT, 340 g of 1,4-butanediol, 6.5 g of pyromellitic dianhydride, 1.0 g of TBOT and 0.4 g of 50% by weight phosphorous acid were reacted as in Ex. 2, adding PMDA right at the start of the reaction.

OH number: 19 mg KOH/g, AN: 1.1 mg KOH/g, VN: 80.1 g/ml, $T_m$: 89° C., Tg: −43° C. (DSC, state as supplied)

Then 300 g of the melt were cooled to 170° C., and 2.06 g of 1,4-butanediol divinyl ether were added in 4 portions in the course of 1 h. This chain extension increased the molecular weight (see GPC values), which led to a marked increase in the melt viscosity.

GPC: (UV 300–800,000 MW range) Mn: 10,954/Mw: 164,250 (g/mol)

Enzyme test with *Rhizopus arrhizus*, ADOC: 700 mg/l for comparison with PCL: ADOC: 3240 mg/l.

We claim:

1. A biodegradable polyester Q1 with a molecular weight ($M_n$) in the range from 6000 to 60,000 g/mol, a viscosity number in the range from 30 to 350 g/ml (measured in o-dichlorobenzene/phenol (50/50 ratio by weight) at a concentration of 0.5% by weight of polyester Q1 at 25° C.) and a melting point in the range from 50° to 170° C., obtained by reacting a mixture comprising (a1) from 95 to 99.9% by weight of a polyester P1 obtained by reacting a mixture consisting essentially of (b1) a mixture consisting essentially of
35–95 mol % of adipic acid or ester-forming derivatives thereof or mixtures thereof,
5–65% mol % of terephthalic acid or ester-forming derivatives thereof or mixtures thereof, and
0–5 mol % of a compound containing sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1, (a2) from 0.1 to 5% by weight of a divinyl ether C1 and (a3) from 0 to 5 mol %, based on component (b1) from the preparation of P1, of compound D.

2. A biodegradable polymer T1 with a molecular weight ($M_n$) in the range from 10,000 to 100,000 g/mol, with a viscosity number in the range from 30 to 450 g/ml (measured in o-dichlorobenzene/phenyl (50/50 ratio by weight) at a concentration of 0.5% by weight of polymer T1 at 25° C.) and a melting point in the range from 50° to 235° C., obtainable by reacting a polyester Q2 with a molecular weight ($M_n$) in the range from 5000 to 100,000 g/mol, a viscosity number in the range from 30 to 450 g/ml (measured in o-dichlorobenzene/phenol (50/50 ratio by weight) at a concentration of 0.5% by weight of polymer Q2 at 25° C.) and a melting point in the range fro 50° to 235° C., obtained by reacting a mixture consisting essentially of (c1) polyester P1 as defined in claim 1, (c2) 0.01–50% by weight, based on (c1) of a hydroxy-carboxylic acid B1 of the formulae Ia or Ib

where p is an integer from 1 to 1500 and r is an integer from 1 to 4, and G is a radical which is selected from the group consisting of phenylene, —$(CH_2)_n$—, where n is an integer from 1 to 5, —C(R)H— and —C(R)HCH$_2$, where R is methyl or ethyl, and (c3) 0–5 mol %, based on component (b1) from the preparation of P1, of compound D, with (d1) 0.1–5% by weight, based on the polyester Q2, of divinyl ether C1 and with (c2) 0–5 mol %, based on component (b1) from the preparation of polyester Q2 via the polyester P1 of compound D.

3. A biodegradable polymer T2 with a molecular weight ($M_n$) in the range from 10,000 to 100,000 g/mol, with a viscosity number in the range from 30 to 450 g/ml (measured in o-dichlorobenzene/phenol (50/50 ratio by weight) at a concentration of 0.5% by weight of polymer T2 at 25° C.) and a melting point in the range from 50° to 235° C., obtained by reacting the polyester Q1 as defined in claim 1 with (e1) 0.01–50% by weight, based on polyester Q1, of hydroxy carboxylic acid B1 of the formulae Ia or Ib

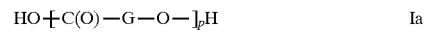

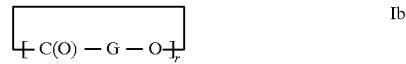

where p is an integer from 1 to 1500 and r is an integer from 1 to 4, and G is a radical which is selected from the group consisting of phenylene, —$(CH_2)_n$—, where n is an integer from 1 to 5, —C(R)H— and —C(R)HCH$_2$, where R is methyl or ethyl, and with (e2) 0–5 mol %, based on the molar quantity of component (b1) employed to prepare polyester Q1, of compound D with at least three ester forming groups.

4. A biodegradable polymer T3 with a molecular weight ($M_n$) in the range from 10,000 to 100,000 g/mol, a viscosity number in the range from 30 to 450 g/ml (measured in o-dichlorobenzene/phenyl (50/50 ratio by weight) at a concentration of 0.5% by weight of polymer T3 at 25° C.) and a melting point in the range from 50° to 235° C., obtained by reacting (f1) a polyester P2 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyester P2 at 25° C.) and a melting point in the range from 50° to 235° C., obtained by reacting a mixture consisting essentially of (g1) a mixture consisting essentially of comprising
20–95 mol % of adipic acid or ester-forming derivatives thereof or mixtures thereof,
5–80 mol % of terephthalic acid or ester-forming derivatives thereof or mixtures thereof, and
0–5 mol % of a compound which contains sulfonate groups, where the total of the individual mole percentages is 100 mol %, (g2) dihydroxy compound (b2) selected from the group consisting of $C_2$–$C_6$-alkanediols and $C_5$–$C_{10}$-cycloalkanediols, where the molar ratio of (g1) to (g2) is chosen in the range from 0.4:1 to 1.5:1, (g3) from 0.01 to 100% by weight, based on component (g1), of hydroxy carboxylic acid B1 according to the formulae Ia or Ib

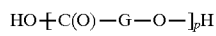 Ia

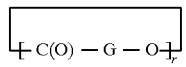 Ib where p is an integer from 1 to 1500 and r is an integer from 1 to 4, and G is a radical which is selected from the group consisting of phenylene, —($CH_2$)$_n$—, where n is an integer from 1 to 5, —C(R)H— and —C(R)H$CH_2$, where R is methyl or ethyl, and (g4) from 0 to 5 mol %, based on component (g1), of compound D with at least three ester-forming groups, or (f2) a mixture consisting essentially of polyester P1 as set forth in claim 1 and 0.01–50% by weight, based on polyester P1, of hydroxy carboxylic acid B1, or (f3) a mixture consisting essentially of polyesters P1 which differ from one another in composition, with 0.1–5% by weight, based on the quantity of the polyesters employed, of divinyl ether C1 and with 0–5 mol %, based on the particular molar quantities of component (b1) or (g1) employed to prepare the polyesters (f1) to (f3) employed, of compound D.

5. A biodegradable thermoplastic molding composition T4, obtained by mixing (h1) 99.5–0.5% by weight of polyester Q1 as set forth in claim 1 with (h2) 0.5–99.5% by weight of hydroxy carboxylic acid B1 of the formulae Ia or Ib

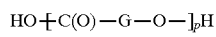 Ia

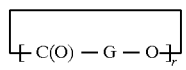 Ib where p is an integer from 1 to 1500 and r is an integer from 1 to 4, and G is a radical which is selected from the group consisting of phenylene, —($CH_2$)$_n$—, where n is an integer from 1 to 5, —C(R)H— and —C(R)—H$CH_2$, where R is methyl or ethyl.

6. A process for preparing a biodegradable polyester Q1 with a molecular weight ($M_n$) in the range from 6000 to 60,000 g/mol, a viscosity number in the range from 30 to 350 g/ml (measured in o-dichlorobenzene/phenyl (50/50 ratio by weight) at a concentration of 0.5% by weight of polyester Q1 at 25° C. and a melting point in the range from 50° to 170° C., which comprises preparing, in a first step, (a1) polyester P1, obtained by reacting a mixture consisting essentially of (b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1, and reacting, in a second step, from 95 to 99.9% by weight of (a1), (a2) from 0.1 to 5% by weight of a divinyl ether C1 and (a3) from 0 to 5 mol %, based on component (b1) from the preparation of P1, of compound D.

7. A process for preparing a biodegradable polymer T1 with a molecular weight ($M_n$) in the range from 10,000 to 100,000 g/mol, with a viscosity number in the range from 30 to 450 g/ml (measured in o-dichlorobenzene/phenol (50/50 ratio by weight) at a concentration of 0.5% by weight of polymer T1 at 25° C.) and a melting point in the range from 50° to 235° C., which comprises preparing, in a first step, a polyester Q2 with a molecular weight ($M_n$) in the range from 5000 to 100,000 g/mol, a viscosity number in the range from 30 to 450 g/ml (measured in o-dichlorobenzene/phenol (50/50 ratio by weight) at a concentration of 0.5% by weight of polymer Q2 at 25° C.) and a melting point in the range from 50° to 235° C. obtained by reacting a mixture consisting essentially of (c1) polyester P1, obtained by reacting a mixture consisting essentially of (b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1, (c2) 0.01–50% by weight, based on (c1) of a hydroxycarboxylic acid B1 of the formulae Ia or Ib

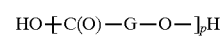 Ia

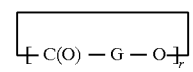 Ib where p is an integer from 1 to 1500 and r is an integer from 1 to 4, and G is a radical which is selected from the group consisting of phenylene, —($CH_2$)$_n$—, where n is an integer from 1 to 5, —C(R)H— and —C(R)H$CH_2$, where R is methyl or ethyl, and (c3) 0–5 mol %, based on component (b1) from the preparation of P1, of compound D, and reacting, in a second step, polyester Q2 with
(d1) 0.1–5% by weight, based on the polyester Q2, of divinyl ether C1 and with
(d2) 0–5 mol %, based on the molar quantity of component (b1) employed to prepare polyester Q2, of component D.

8. A process for preparing a biodegradable polymer T2 with a molecular weight ($M_n$) in the range from 10,000 to 100,000 g/mol, with a viscosity number in the range from 30 to 450 g/ml (measured in o-dichlorobenzene/phenol (50/50 ratio by weight) at a concentration of 0.5% by weight of polymer T2 at 25° C.) and a melting point in the range from 50° to 235° C., which comprises preparing, in a first step, a polyester Q1 with a molecular weight ($M_n$) in the range from 6000 to 60,000 g/mol, a viscosity number in the range from 30 to 350 g/ml (measured in o-dichlorobenzene/phenol (50/50 ratio by weight) at a concentration of 0.5% by weight of polymer Q1 at 25° C.) and a melting point in the range from 50° to 170° C. obtained by reacting a mixture consisting essentially of
(a1) from 95 to 99.9% by weight of a polyester P1 obtained by reacting a mixture consisting essentially of
(b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and
(b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1,
with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1,
(a2) from 0.1 to 5% by weight of a divinyl ether C1 and
(a3) from 0 to 5 mol %, based on the molar quantity of component (b1), of compound D, and reacting, in a second step, polyester Q1 with
(e1) 0.01–50% by weight, based on polyester Q1, of hydroxy carboxylic acid B1 of the formulae Ia or Ib

where p is an integer from 1 to 1500 and r is an integer from 1 to 4, and G is a radical which is selected from the group consisting of phenylene, —(CH$_2$)$_n$—, where n is an integer from 1 to 5, —C(R)H— and —C(R)HCH$_2$, where R is methyl or ethyl, and with
(e2) 0–5 mol %, based on component (b1) from the preparation of P1, of compound D.

9. A process for preparing a biodegradable polymer T3 with a molecular weight ($M_n$) in the range from 10,000 to 100,000 g/mol, with a viscosity number in the range from 30 to 450 g/ml (measured in o-dichlorobenzene/phenol (50/50 ratio by weight) at a concentration of 0.5% by weight of polymer T3 at 25° C.) and a melting point in the range from 50° to 235° C., which comprises preparing, in a first step,
(f1) a polyester P2 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyester P2 at 25° C.) and a melting point in the range from 50° to 235° C., obtained by reacting a mixture consisting essentially of
(g1) a mixture consisting essentially of
20–95 mol % of adipic acid or ester-forming derivatives thereof or mixtures thereof,
5–80 mol % of terephthalic acid or ester-forming derivatives thereof or mixtures thereof, and
0–5 mol % of a compound which contains sulfonate groups, where the total of the individual mole percentages is 100 mol %,
(g2) dihydroxy compound (b2) selected from the group consisting of $C_2$–$C_6$-alkanediols and $C_5$–$C_{10}$-cycloalkanediols, where the molar ratio of (b1) to (b2) is chosen in the range from 0.4:1 to 1.5:1,
where the molar ratio of (g1) to (g2) is chosen in the range from 0.4:1 to 1.5:1,
(g3) from 0.01 to 100% by weight, based on component (g1), of hydroxy carboxylic acid B1 according to the formulae Ia or Ib

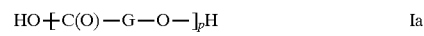

where p is an integer from 1 to 1500 and r is an integer from 1 to 4, and G is a radical which is selected from the group consisting of phenylene, —(CH$_2$)$_n$—, where n is an integer from 1 to 5, —C(R)H— and —C(R)HCH$_2$, where R is methyl or ethyl, and with
(g4) from 0–5 mol %, based on component (g1) of compound D with at least three groups capable of ester formation, or
(f2) a mixture comprising polyester P1 obtained by reacting a mixture consisting essentially of
(b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and
(b2) a dihydroxy compound selected from the group consisting of C2$_2$–$C_6$-alkanediols and $C_5$–$C_{10}$-cycloalkanediols, where the molar ratio of (b1) to (b2) is chosen in the range from 0.4:1 to 1.5:1,
with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1, and 0.1–50% by weight, based on polyester P1, of hydroxy carboxylic acid B1, or (f3) a mixture comprising polyesters P1 which differ from one another in composition, and reacting, in a second step, with 0.1–5% by weight, based on the quantity of the polyesters employed, of divinyl ether C1 and with 0–5 mol %, based on the particular molar quantities of component (b1) employed to prepare the polyesters (f1) to (f3) employed, of compound D.

10. A process for preparing biodegradable thermoplastic molding composition T4, which comprises preparing, in a first step, polyester Q1 with a molecular weight ($M_n$) in the range from 6000 to 60,000 g/mol, a viscosity number in the range from 30 to 350 g/mol (measured in o-dichlorobenzene/phenol (50/50 ratio by weight) at a concentration of 0.5% by weight of polyester Q1 at 25° C.) and a melting point in the range from 50° to 170° C., obtained by reacting a mixture comprising (a1) from 95 to 99.9% by weight of a polyester P1 obtained by reacting a mixture consisting essentially of (b1) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and (b2) a dihydroxy compound selected from the group consisting of $C_2$–$C_6$-alkanediols and $C_5$–$C_{10}$-cycloalkanediols, where the molar ratio of (b1) to (b2) is chosen in the range from 0.4:1 to 1.5:1, with the proviso that the polyester P1 has a molecular weight ($M_n$) in the range from 5000 to 50,000 g/mol, a viscosity number in the range from 30 to 350 g/ml (measured in o-dichlorobenzene/phenol (50/50 ratio by weight) at a concentration of 0.5% by weight of polyester P1 at 25° C.) and a melting point in the range from 50° to 170° C., and with the further proviso that from 0 to 5 mol %, based on the molar quantity of component (b1) employed, of a compound D with at least three ester-forming groups are employed to prepare the polyester P1, (a2) from 0.1 to 5% by weight of a divinyl ether C1 and (a3) from 0 to 5 mol %, based on component (b1) from the preparation of P1, of compound D, and mixing, in a second step, 99.5–0.5% by weight of polyester Q1 with 0.5–99.5% by weight of hydroxy carboxylic acid B1.

11. A compostable molding obtained from the polyester Q1 defined in claim 1.

12. An adhesive obtained from the polyester Q1 defined in claim 1.

13. A biodegradable blend obtained from the polyester Q1 defined in claim 1 and starch.

14. A biodegradable foam obtained from the polyester Q1 defined in claim 1.

15. A paper coating composition obtained from the polyester Q1 defined in claim 1.

* * * * *

UNITED STATES PATENT AND TRADEMARK OFFICE
CERTIFICATE OF CORRECTION

PATENT NO.: 5,817,721

DATED: October 6, 1998

INVENTOR(S): WARZELHAN et al.

It is certified that error appears in the above-identified patent and that said Letters Patent is hereby corrected as shown below:

Col. 15, claim 1, line 25, "$C2_2-C_6-$" should be -- $C_2-C_6-$ --.

Col. 15, claim 2, line 48, "obtainable" should be --obtained--.

Col. 16, claim 4, line 51, delete "comprising".

Col. 17, claim 4, line 20 "which differ from one another in composition" should be -- as set forth in claim 1--.

Col. 17, claim 5, line 42 to line 43, "$-C(R)-HCH_2$" should be -- $-C(R)HCH_2-$--.

Col. 17, line 48, "Q1at 25°C." should be --Q1 at 25°C.)--.

Col. 20, claim 9, line 40, "$-(CH_2)-$" should be -- $-(CH_2)_n-$ --.

Col. 20, claim 9, line 58, "$C2_2-C_6-$" should be -- $C_2-C_6-$ --.

Signed and Sealed this

Ninth Day of March, 1999

*Attest:*

Q. TODD DICKINSON

*Attesting Officer*    *Acting Commissioner of Patents and Trademarks*